(12) United States Patent
Russell et al.

(10) Patent No.: US 7,523,106 B2
(45) Date of Patent: Apr. 21, 2009

(54) COMPUTERIZED DATA MINING SYSTEM, METHOD AND PROGRAM PRODUCT

(75) Inventors: Feng-wei Chen Russell, Cary, NC (US); Ameet M. Kini, Sterling, VA (US); Marcelo Cunha Loureiro, New York, NY (US); John A. Medicke, Jr., Raleigh, NC (US); Betsy M. Plunket, Raleigh, NC (US); Ashish Sureka, Raleigh, NC (US)

(73) Assignee: International Business Machines Coporation, Armonk, NY (US)

( * ) Notice: Subject to any disclaimer, the term of this patent is extended or adjusted under 35 U.S.C. 154(b) by 480 days.

(21) Appl. No.: 10/720,792

(22) Filed: Nov. 24, 2003

(65) Prior Publication Data

US 2005/0114360 A1 May 26, 2005

(51) Int. Cl.
*G06F 17/30* (2006.01)
(52) U.S. Cl. .................. 707/5; 707/2; 707/3; 707/4; 707/102
(58) Field of Classification Search .................. 707/5–7, 707/100, 102
See application file for complete search history.

(56) References Cited

U.S. PATENT DOCUMENTS

| | | | |
|---|---|---|---|
| 5,526,281 | A | 6/1996 | Chapman et al. |
| 5,526,293 | A | 6/1996 | Mozumder et al. |
| 5,621,652 | A | 4/1997 | Eakin |
| 5,680,590 | A | 10/1997 | Parti |
| 5,692,107 | A | 11/1997 | Simoudis et al. |
| 5,875,284 | A | 2/1999 | Watanabe et al. |
| 6,094,654 | A * | 7/2000 | Van Huben et al. ............. 707/8 |
| 6,185,549 | B1 | 2/2001 | Rastogi et al. |
| 6,240,411 | B1 * | 5/2001 | Thearling ...................... 707/5 |
| 6,393,387 | B1 | 5/2002 | Adriaans et al. |

(Continued)

FOREIGN PATENT DOCUMENTS

GB 2227106 A 7/1990

(Continued)

OTHER PUBLICATIONS

Yo-Ping Huang et. al., "A Systematic Method to Design a Fuzzy Data Mining Model", 2002 IEEE International Conference on Fuzzy Systems Proceedings, vol. 2, pp. 896-901.

(Continued)

*Primary Examiner*—Cam Y T Truong
(74) *Attorney, Agent, or Firm*—Andre Gibbs; Hoffman Warnick LLC

(57) ABSTRACT

Under the present invention, a data exploration system, a customized model system and an existing model system are provided. The data exploration system analyzes user data to identify statistical information such as data distribution, data relationships, data outliners and invalid or missing data values. The customized model center iteratively generates customized data mining models in parallel based on permutations of the user data, user-provided business parameters and/or a set of model generation algorithms. The existing model system provides users with a library of existing data mining models, assembled based on the business parameters, from which they can choose one or more. In any event, any customized or existing data mining models selected can be run against the user data in parallel.

4 Claims, 7 Drawing Sheets

U.S. PATENT DOCUMENTS

| | | |
|---|---|---|
| 6,456,989 B1 | 9/2002 | Kawamura et al. |
| 6,519,602 B2 | 2/2003 | Sundaresan et al. |
| 6,532,412 B2 | 3/2003 | Adibhatla et al. |
| 6,539,300 B2 | 3/2003 | Myr |
| 6,553,366 B1* | 4/2003 | Miller et al. .................... 707/2 |
| 6,677,963 B1* | 1/2004 | Mani et al. ................... 715/764 |
| 6,687,696 B2* | 2/2004 | Hofmann et al. ................ 707/6 |
| 6,826,556 B1* | 11/2004 | Miller et al. .................... 707/2 |
| 6,920,458 B1* | 7/2005 | Chu et al. ................... 707/102 |
| 7,117,480 B2* | 10/2006 | Andersh et al. ............. 717/120 |
| 2002/0099581 A1* | 7/2002 | Chu et al. ....................... 705/7 |
| 2002/0127529 A1* | 9/2002 | Cassuto et al. .............. 434/335 |
| 2003/0059837 A1* | 3/2003 | Levinson et al. ............. 435/7.1 |
| 2003/0212691 A1* | 11/2003 | Kuntala et al. .............. 707/100 |

FOREIGN PATENT DOCUMENTS

| | | |
|---|---|---|
| JP | 10065159 A | 3/1998 |
| SU | 903873 | 2/1982 |

OTHER PUBLICATIONS

Hercules A. Prado, "Accuracy Tuning on Combinatorial Neural Model", Third Pacific-Asia Conference, PAKDD-99, Beijing, China, Apr. 26-28, 1999 Proceedings, pp. 247-251.

* cited by examiner

COMPUTERIZED DATA MINING SYSTEM, METHOD AND PROGRAM PRODUCT

BACKGROUND OF THE INVENTION

1. Field of the Invention

In general, the present invention provides a computerized data mining system, method and program product. Specifically, the present invention provides a network-based system for obtaining and executing a data mining model to provide business analytics.

2. Related Art

As businesses increasingly rely upon computer technology to perform essential functions, data mining is rapidly becoming vital to business success. Specifically, many businesses gather various types of data about the business and/or its customers so that operations can be gauged and optimized. Typically, a business will gather data into a database or the like and then utilize a data mining model to analyze the data.

Unfortunately, many companies are unable to flexibly integrate data analytics into business processes because of the complexity, expense, and incomprehensibility often involved. For example, in terms of infrastructure, companies often must invest substantial resources to build data warehouses, implement servers, hire "mining experts" and IT staff to use mining software, etc. In terms of processes, companies must then spend considerable time mapping and tuning between data and mining functions. To this extent, business analysts are typically required to possess the mining domain knowledge to choose the best mining algorithm and select appropriate data. In general, there can be more than twenty technically oriented parameters to tune and map. However, in reality, business analysts might know their data and business objectives well, but might not have an in-depth knowledge of the mining algorithm and/or the tuning parameters.

In fact, very few segments in industry have the resources (human and financial) to deploy sophisticated data analytics solutions such as data mining and scoring. Basically to deploy data mining techniques, companies have two choices: (1) acquire data mining tools and hire an industry specialist to prepare the environment and set up the tool to be used; or (2) hire external consultants to avoid the lack of skills, and large investments in infrastructure companies. Both cases are an extremely expensive proposition for most companies due to the complexity of data integration and the tight binding of complex models to the analytics process.

Heretofore, attempts have been made at automating the data mining process. No existing system, however, allows data mining models to be iteratively generated and/or executed in parallel. That is, any existing systems that provide for the generation or execution of data mining models do so one data mining model at a time.

In view of the foregoing, there exists a need for a computerized data mining system, method and program product. Specifically, a need exists for a system that can iteratively generate customized data mining models in parallel based on permutations of user data, user-provided business parameters and/or a set of model generation algorithms. A further need exists for a system that allows a user to select existing data mining models from a library of existing data mining models that is assembled based on the business parameters. Still yet, another need exists for a system that can execute multiple customized or existing data mining models in parallel.

SUMMARY OF THE INVENTION

In general, the present invention provides a computerized data mining system, method and program product. Specifically, under the present invention, a data exploration system, a customized model system and an existing model system are provided. The data exploration system analyzes user data to identify statistical information such as data distribution, data relationships, data outliners and invalid or missing data values. The customized model center iteratively generates customized data mining models in parallel based on user data, user-provided business parameters and/or a set of model generation algorithms. The existing model system provides users with a library of existing data mining models, assembled based on the business parameters, from which they can chose one or more. In any event, any customized or existing data mining models selected can be run against the user data in parallel.

A first aspect of the present invention provides a computerized data mining system, comprising: a data exploration system for receiving and analyzing user data to provide statistical information about the user data; a customized model system for generating and ranking customized data mining models, and for executing a selected customized data mining model on the user data, wherein the customized data mining models are iteratively generated in parallel based on permutations of at least one of the user data, business parameters and a set of model generation algorithms; and an existing model system for selecting at least one existing data mining model from a library of existing data mining models, and for executing the selected at least one existing data mining model in parallel on the user data A second aspect of the present invention provides a computerized system for generating and executing customized data mining models, comprising: a model generation system for iteratively generating the customized data mining models in parallel based on the permutations of at least one of user data, business parameters and a set of model generation algorithms; a model ranking system for ranking the customized data mining models based on the business parameters, for identifying a predetermined quantity of the ranked customized data mining models, and for providing comparative data corresponding to the predetermined quantity of the ranked customized data mining models; a customized model selection system for selecting at least one customized mining model from the predetermined quantity; and a customized model execution system for executing the selected at least one customized data mining model on the user data.

A third aspect of the present invention provides a computerized system for selecting and executing existing data mining models: a model library system for assembling a library of existing data mining models based on a business parameters, and for displaying the library of existing data mining models and comparative data corresponding to the library of existing data models; an existing model selection system for selecting at least one existing data mining model from the library of existing data mining models; an existing model execution system for executing the at least one existing data mining model on the user data in parallel; and a model comparison system for comparing results of the execution of the at least one existing data mining model.

A fourth aspect of the present invention provides a computer-implemented method for generating customized data mining models, comprising: providing user data and business parameters; iteratively generating a plurality of customized data mining models in parallel based on permutations of at least one of the user data, the business parameters and a set of model generation algorithms; ranking the plurality of customized data mining models based on the business parameters; selecting at least one customized data mining model from the ranked plurality of customized data mining models; and executing the selected at least one customized data mining model on the user data.

A fifth aspect of the present invention provides a computer-implemented method for selecting existing data mining models, comprising: providing user data and business parameters; assembling a library of existing data mining models based on the business parameters; displaying the library of existing data mining models and comparative data corresponding to the library of data mining models; selecting at least one existing data mining model from the library of existing data mining models; executing the at least one existing data mining model on the user data in parallel; and comparing results of the execution of the at least one existing data mining model.

A sixth aspect of the present invention provides a data mining computer program product stored on a recordable medium, which when executed, comprises: program code for receiving and analyzing user data to provide statistical information about the user data; program code for generating and ranking customized data mining models, and for executing a selected customized data mining model on the user data, wherein the customized data mining models are iteratively generated in parallel based on permutations of at least one of the user data, business parameters and a set of model generation algorithms; and program code for selecting at least one existing data mining model from a library of existing data mining models, and for executing the selected at least one existing data mining model in parallel on the user data A seventh aspect of the present invention provides a program product stored on a recordable medium for generating and executing customized data mining models, which when executed comprises: program code for iteratively generating the customized data mining models in parallel based on the permutations of at least one of user data, business parameters and a set of model generation algorithms; program code for ranking the customized data mining models based on the business parameters, for identifying a predetermined quantity of the ranked customized data mining models, and for providing comparative data corresponding to the predetermined quantity of the ranked customized data mining models; program code for selecting at least one customized mining model the predetermined quantity; and program code for executing the selected at least one customized data mining model on the user data.

An eighth aspect of the present invention provides a program product stored on a recordable medium for selecting and executing existing data mining models, which when executed comprises: program code for assembling a library of existing data mining models based on a business parameters, and for displaying the library of existing data mining models and comparative data corresponding to the library of existing data models; program code for selecting at least one existing data mining model from the library of existing data mining models; program code for executing the at least one existing data mining model on the user data in parallel; and program code for comparing results of the execution of the at least one existing data mining model.

Therefore, the present invention provides a computerized data mining system, method and program product.

BRIEF DESCRIPTION OF THE DRAWINGS

These and other features of this invention will be more readily understood from the following detailed description of the various aspects of the invention taken in conjunction with the accompanying drawings in which.

Figure 1:
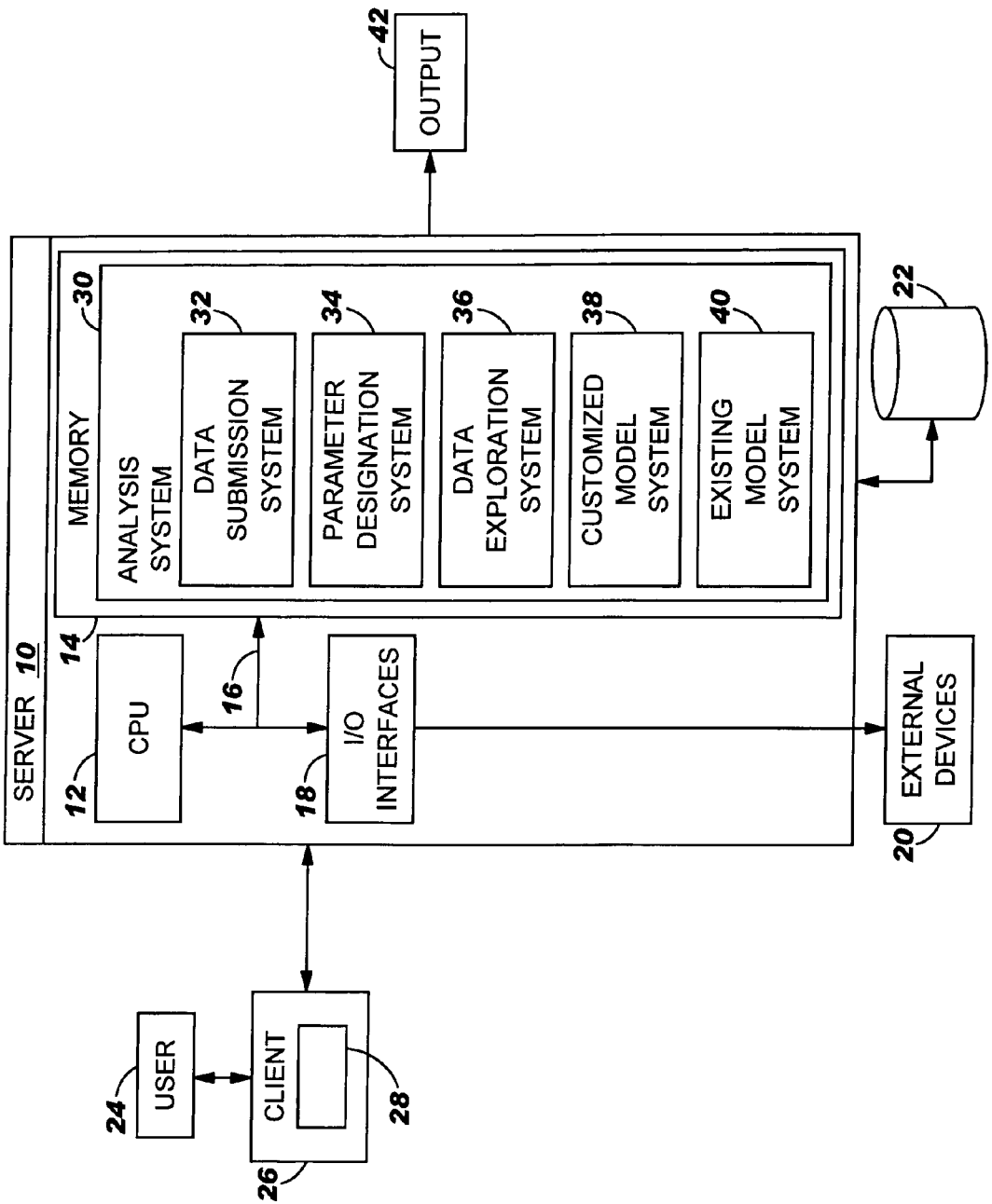
FIG. 1 depicts a computerized data mining system according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a computerized data mining system, method and program product. Specifically, under the present invention, a data exploration system, a customized model system and an existing model system are provided. The data exploration system analyzes user data to identify statistical information such as data distribution, data relationships, data outliners and invalid or missing data values. The customized model center iteratively generates customized data mining models in parallel based on user data, user-provided business parameters and/or a set of model generation algorithms. The existing model system provides users with a library of existing data mining models, assembled based on the business parameters, from which they can chose one or more. In any event, any customized or existing data mining models selected can be run against the user data in parallel.

It should be understood in advance that the present invention could be implemented as a "business method" such that it is provided as a subscription or profit-based system. For example, businesses wishing to generate their own customized data mining models, or to select from existing data mining models, could be charged a one time fee or a periodic subscription fee.

Referring now to FIG. 1, a computerized data mining system according to the present invention is shown. In general, the system of FIG. 1 allows users such as user 24 to obtain a data mining model (e.g., create a customized data mining model or select an existing data mining model), and then execute that data mining model against its user data. In general, the present invention is implemented in a network environment such as over the Internet, a local area network (LAN), a wide area network (WAN), a virtual private network (VPN), etc. Accordingly, user 24 operates a client 26 to interact with server 10. To this extent, client 26 is intended to represent any type of computerized device that is capable of communicating with server 10. For example, client 26 could be a personal computer, workstation, a laptop, a hand-held device, etc. In addition, communication between server 10 and client 26 could occur via a direct hardwired connection (e.g., serial port), or via an addressable connection that may utilize any combination of wireline and/or wireless transmission methods. Server 10 and client 26 may utilize conventional network connectivity, such as Token Ring, Ethernet, WiFi or other conventional communications standards. Moreover, connectivity could be provided by conventional TCP/IP sockets-based protocol. In this instance, client 26 could use an Internet service provider to establish connectivity to server 10.

As shown, server 10 comprises central processing unit (CPU) 12, memory 14, bus 16, input/output (I/O) interfaces 18, external devices/resources 20 and storage unit 22. CPU 12 may comprise a single processing unit, or be distributed across one or more processing units in one or more locations. Memory 14 may comprise any known type of data storage medium including magnetic storage medium, optical storage medium, random access memory (RAM), read-only memory (ROM), a data cache memory. Moreover, similar to CPU 12, memory 14 may reside at a single physical location, comprising one or more types of data storage, or be distributed across a plurality of physical systems in various forms.

I/O interfaces 18 may comprise any system for exchanging information to/from an external source. External devices/resources 20 may comprise any known type of external device, including speakers, a CRT, LCD screen, handheld device, keyboard, mouse, voice recognition system, speech output system, printer, monitor/display, facsimile, pager, etc. Bus 16 provides a communication link between each of the components in server 10 and likewise may comprise any known type of transmission link, including electrical, optical, wireless, etc.

Storage unit 22 can be any system (e.g., database) capable of providing storage for data under the present invention such as user data, designated business parameters, model generation algorithms, etc. As such, storage unit 22 could include one or more storage devices, such as a magnetic disk drive or an optical disk drive. In another embodiment, storage unit 22 includes data distributed across, for example, a local area network (LAN), wide area network (WAN) or a storage area network (SAN) (not shown). Further, although not shown, additional components, such as cache memory, communication systems, system software, etc., may be incorporated into server 10. Moreover, it should be understood that client 26 will include computer components similar to server 10, such components have not been shown for brevity purposes.

Shown in memory of server 10 is analysis system 30, which includes data submission system 32, parameter designation system 34, data exploration system 36, customized model system 38 and existing model system 40. It should be understood that the depiction of analysis system 30 shown in FIG. 1 is intended to be illustrative only and that other variations could be implemented. For example, data submission system 32 and parameter designation system could be implemented as a single "input" system. In any event, user 24 can gain access to analytics system 30 via web browser 28 on client 26. Once access is gained, user 24 will submit user data that is desired to be analyzed/mined via data submission system 32. The user data can be submitted in a flat file or through any other known means. Once the user data has been provided, user 24 can utilize data exploration system 36 to learn more "statistical" information about the user data. For example, once the user data is submitted, data exploration system 36 will analyze the data to inform user 24 of information such as data distributions, data relationships, data outliners, missing and/or invalid data values, etc. This information is extremely helpful in aiding user 24's understanding of his/her user data.

Figure 2:
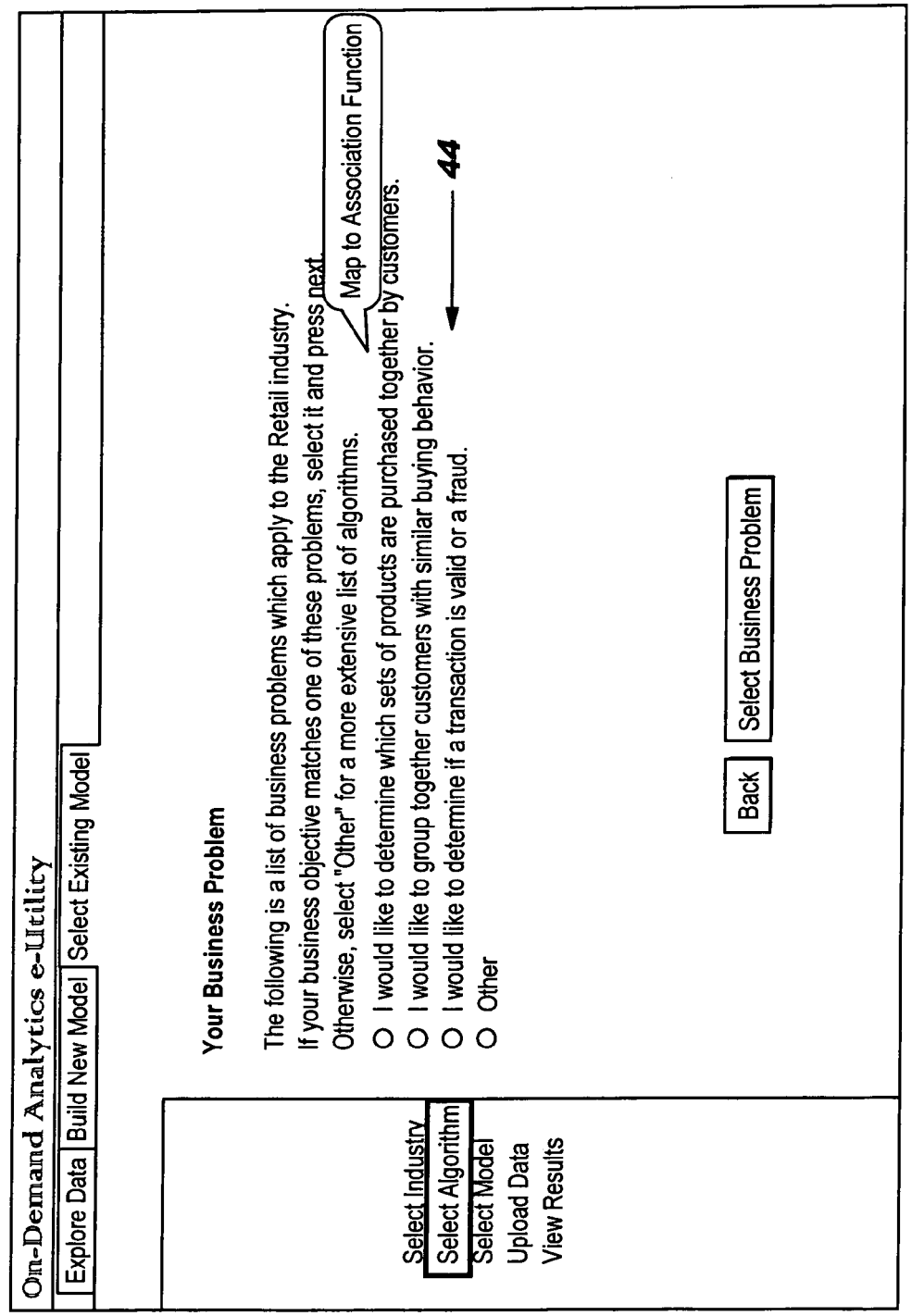
FIG. 2 depicts an illustrative business problem interface.
Figure 3:
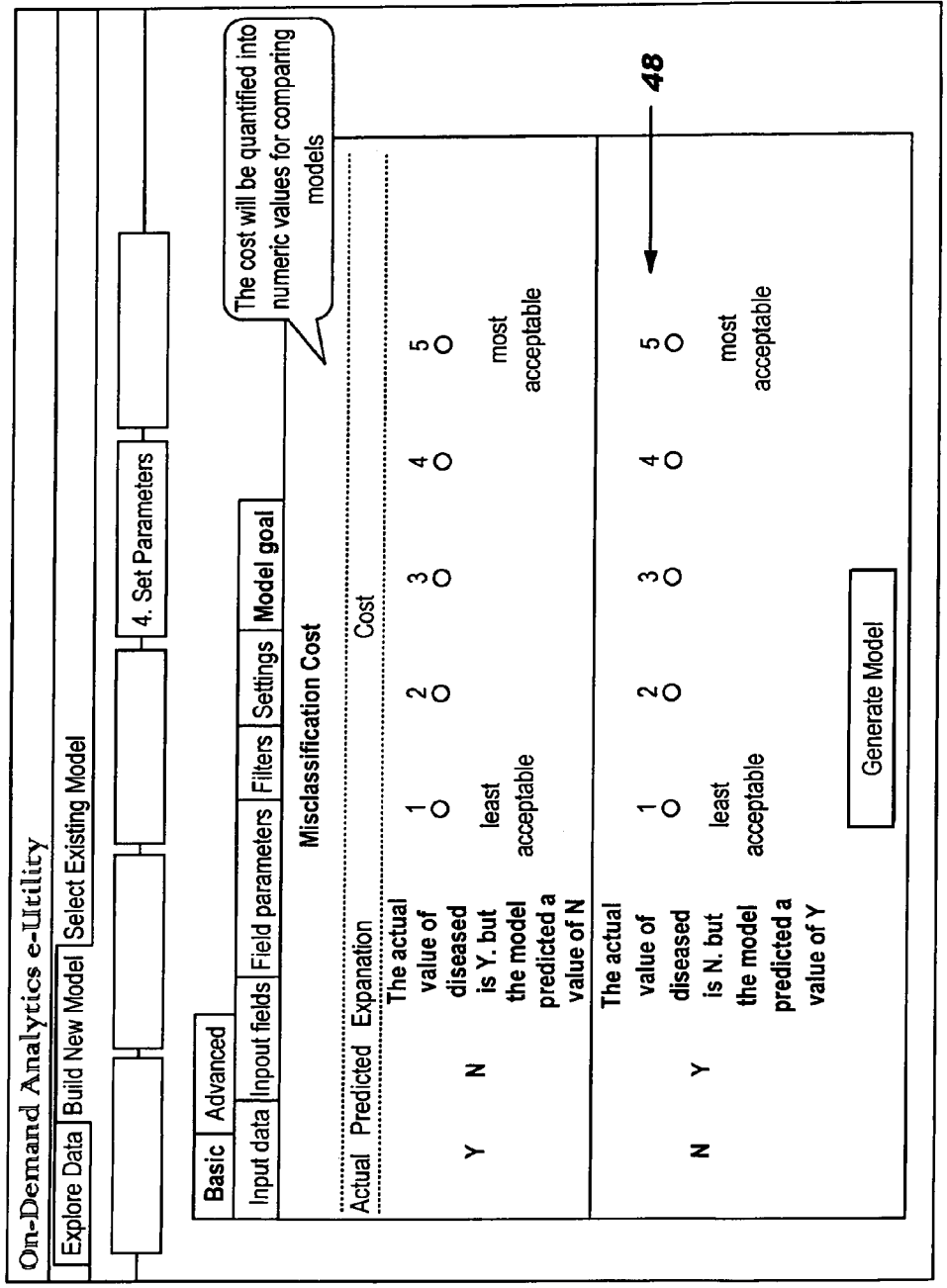
FIG. 3 depicts an illustrative model goal interface.

Under the present invention, user 24 will then designate business parameters via parameter designation system 34. In designating business parameters, user 24 will use a series of interfaces provided by parameter designation system 34 to designate a business field/taxonomy (e.g., financial, banking, etc.), business problems (e.g., determining whether transactions are fraudulent, etc.) and goals for the eventual mining model (e.g., a misclassification cost). Referring to FIG. 2, an illustrative business problem interface 42 is shown. As depicted, interface 42 lists several problem "choices" 44 from which user 24 can select. Referring to FIG. 3, an illustrative model goal interface 46 is shown for user 24 to designate the mining model goal(s). In a typical embodiment, the mining model goal is quantified into numeric values 48 for ranking the models (which will be further described below). It should be understood that interfaces 42 and 46 are illustrative only and that other variations could be implemented.

Figure 4:
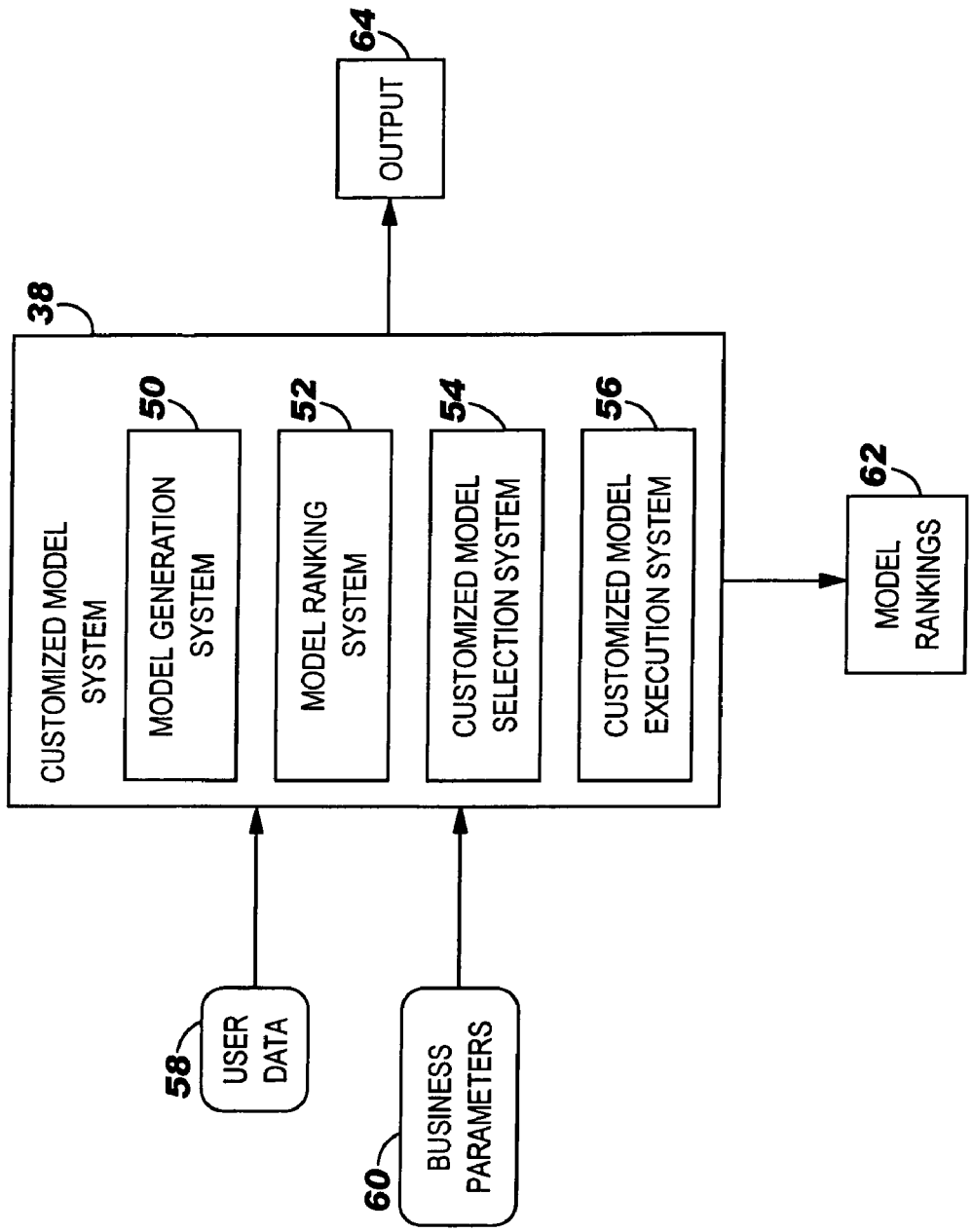
FIG. 4 depicts the customized model system of FIG. 1.

Once user data and the business parameters have been provided, user 24 can create a customized and/or select an existing data mining model. If user 24 wishes to generate a customized data mining model, user 24 will implement customized model system 38 (FIG. 1). Referring to FIG. 4, customized model system 38 is shown and described in greater detail. As depicted, customized model system 38 includes model generation system 50, model ranking system 52, customized model selection system 54 and customized model execution system 56. Using the user data 58, business parameters 60 and predetermined model generation algorithms, model generation system 50 will iteratively generate a plurality of data mining models in parallel. Specifically, an "iterator" within model generation system 50 will develop various permutations of the user data 58, business parameters 60 and/or the model generation algorithms (collectively referred to as model generation details), and iteratively generate multiple data mining models based thereupon. For example, model generation system 50 can perform permutations such as shuffling data, changing model generation algorithms, etc. Regardless, model generation system 50 will generate the data mining models in parallel (e.g., in a grid-like fashion) such that all data mining models are generated at the same time/simultaneously. This avoids the inefficiencies with having to generate each data mining model one at a time. To this extent, although not shown in FIG. 1, multiple computerized "machines" could be provided in communication with server 10 that each generates one or more data mining models.

Once the customized data mining models have been generated as described, model ranking system 52 will rank the generated models based on how they would address the business parameters 60 (e.g., mining model goals). Once ranked, a predetermined quantity of the ranked data mining models will be provided to user 24. For example, if model generation system 50 generated ten data mining models, model ranking system 52 might rank all ten, but only display the top five to user 24 (although all ten could be presented if so desired). In viewing the presented rankings, user 24 can then use customized model selection system 54 to select one or more of the generated data mining models. After selecting the desired data mining model(s), user 24 will use customized model execution system 56 to execute each selected data mining models against the user data 58. Similar to the generation of the data mining models, the execution of multiple data mining models can be performed in parallel (e.g., in a grid fashion) by multiple machines (not shown) in communication with server 10. In any event, the results of each such execution could be collated and be provided to user as output 64 for comparison.

Figure 5:
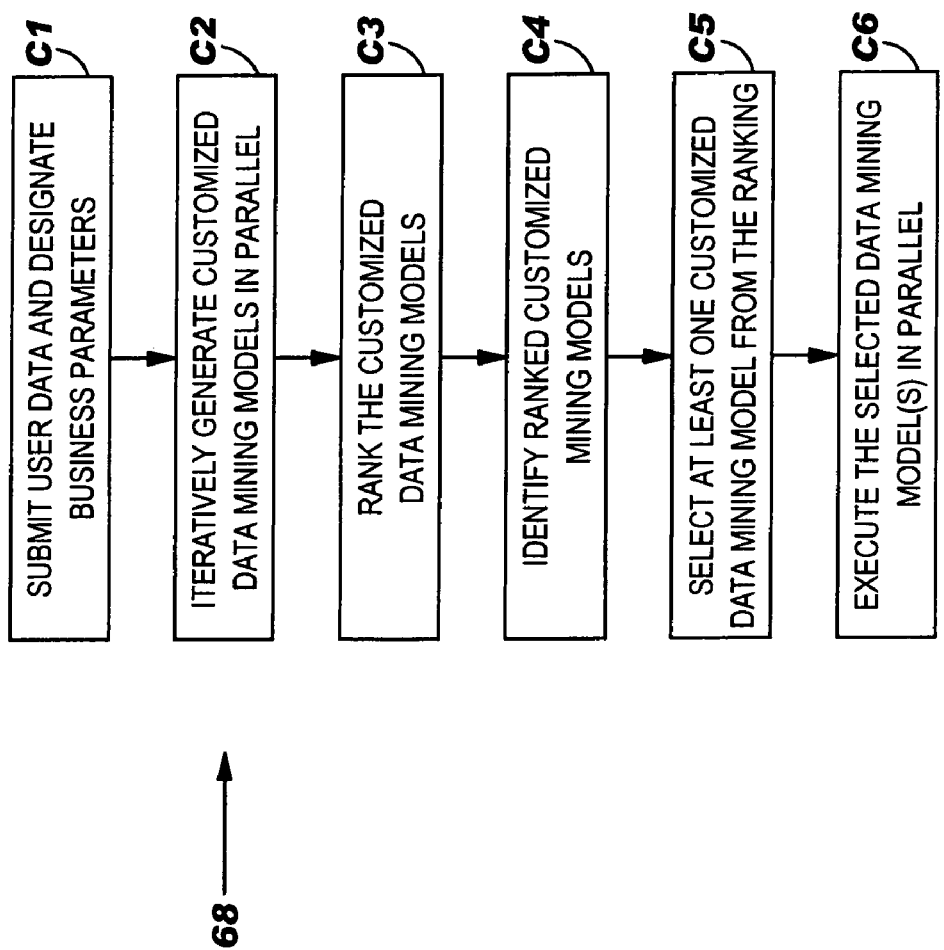
FIG. 5 depicts a method flow diagram for generating and executing customized data mining models according to the present invention.

Referring to FIG. 5, a method flow diagram 68 depicting the model generation process provided by customized model system 38 is shown. First step C1 of method 68 is to submit user data and designate business parameters. Second step C2 is to iteratively generate customized data mining models in parallel by making permutations of model generation details (e.g., the user data, business parameters and/or model generation algorithms). Third step C3 is to rank the generated customized data mining models, a predetermined quantity of which are identified to the user in step C4. In step C5, the user will select at least one customized data model from the ranking, and then execute the selected data mining model(s) in parallel against the data in step C6.

Figure 6:
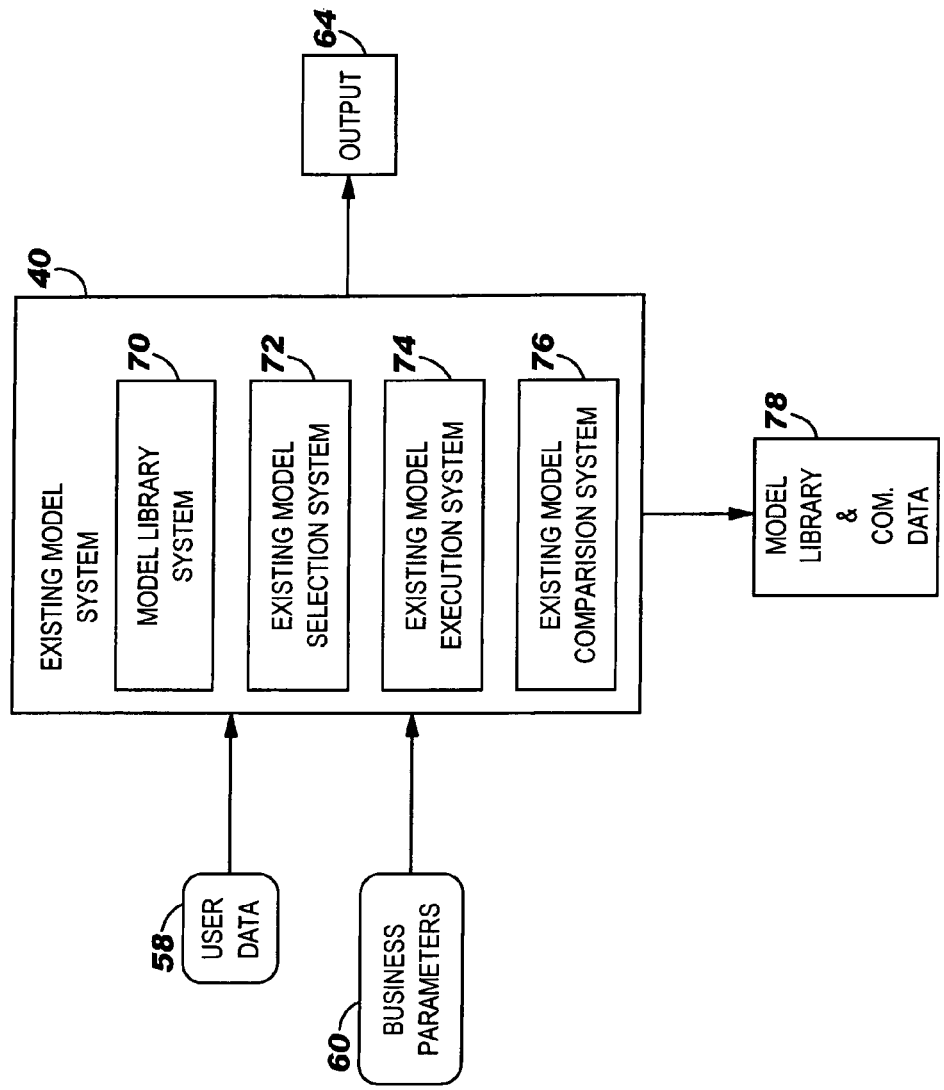
FIG. 6 depicts the existing model system of FIG. 1.

As indicated above, the present invention provides a user with the capability to generate customized data mining models, and/or select existing data mining models. Referring now to FIG. 6, the existing model system 40 by which existing data mining models are selected is shown. As depicted, existing model system 40 includes model library system 70, existing model selection system 72, existing model execution system 74 and existing model comparison system 76. Similar to generating a customized data mining model, user 24 (FIG. 1) will submit user data 58 and business parameters 60. Once submitted, model library system 70 will access all existing data mining models. Based on the business parameters 60, model library system 70 will then provide user 24 with a library of applicable data mining models 78 as well as comparative data corresponding thereto. For example, if based on user 24's identified mining model goals, model library system 70 identified ten possible existing mining models that would be most applicable to user 24, those ten data mining models would be identified to user 24 in an interface or the like. Along with identifying the data mining models, model library system 70 could display comparative data/statistics about how the mining models performed historically (e.g., number of observations, correct hits, false alarms, false dismissals, correct dismissals, etc.). This type of information could help user 24 in selecting the one or more existing data mining models that are the most appropriate and accurate.

Using existing model selection system 72, user 24 can then select one or more data mining models from the library. Upon such a selection, existing model execution system 74 will execute each selected data mining model on the user data 58 in parallel (e.g. in a grid fashion). After being executed the results from each data mining model can be output to user 24 as output/results 64. At this point, user 24 can compare the analytics across all selected data mining models and make a long term decision to implement one or more of such models.

Figure 7:
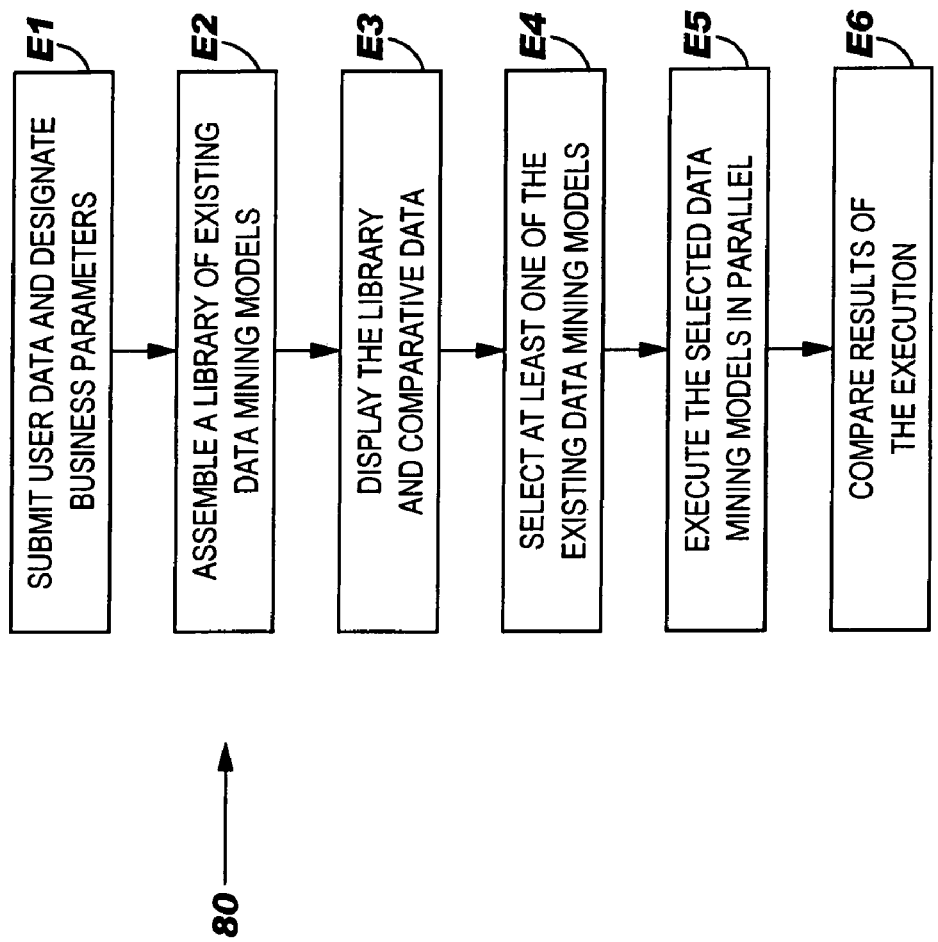
FIG. 7 depicts a method flow diagram for selecting and executing existing data mining models according to the present invention.

Referring now to FIG. 7, a method flow diagram 80 depicting the existing model selection process provided by existing model system 40 is shown. First step E1 is to submit user data and designate business parameters. Second step E2 is to assemble the library of existing data mining models, which is displayed along with comparative data in step E3. Next, the user can select at least one of the existing data mining models in step E4. Each selected data mining model will be executed against the user data in parallel in step E5, and the result will be outputted for comparison in step E6.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, although not shown, an authentication/verification system could be provided for user 24 to log and be authenticated/verified before using analysis system 30. This could especially be the case if the present invention is implemented under a fee-based structure.

We claim:

1. A computer-implemented method for generating customized data mining models, comprising:
   receiving and analyzing user data to provide statistical information about the user data, wherein the statistical information comprises data relationships, data outliners, invalid data values and standard deviations;
   generating and ranking customized data mining models, and executing a selected customized data mining model of the customized data models on the user data, wherein the customized data mining models are generated using multiple iterations based on permutations of at least one of the user data, business parameters and a set of model generation algorithms,
   wherein the generating and ranking comprises:
      generating the customized data mining models in parallel using multiple iterations based on the permutations of at least one of the user data, the business parameters and the set of model generation algorithms, wherein the business parameters comprise a business taxonomy and a set of model goals,
      ranking the customized data mining model based on the business parameters, identifying a predetermined quantity of the ranked customized data mining models, and providing comparative data corresponding to the predetermined quantity of the ranked customized data mining models;
      selecting at least one customized mining model from the predetermined quantity; executing the selected at least one customized data mining model on the user data; and selecting at least one existing data mining model from a library of existing data mining models, and executing the selected at least one existing data mining model in parallel on the user data, and outputting a result of the executing of the selected at least one customized data mining model to a user.

2. The computer-implemented method of claim 1, further comprising:
   identifying a predetermined quantity of the ranked plurality of customized data mining models; and providing comparative data corresponding to the predetermined quantity of the ranked plurality of customized data mining models, prior to the selecting step.

3. The computer-implemented method of claim 1, wherein the step of generating comprises:

forming multiple permutations of at least one of the user data, the business parameters and the set of model generation algorithms; and generating a plurality of customized data mining models using multiple iterations in a grid environment based on the multiple permutations.

4. The computer-implemented method of claim 1, wherein the business parameters comprise a business taxonomy, a set of business problems and a set of model goals.

* * * * *